United States Patent
Ikari et al.

[11] Patent Number: 6,145,636
[45] Date of Patent: Nov. 14, 2000

[54] VENTILATED ROTOR

[75] Inventors: Hiroyuki Ikari; Masayuki Fukuda, both of Kanagawa-ken, Japan

[73] Assignee: Nissan Motor Co., Ltd., Yokohama, Japan

[21] Appl. No.: 09/156,673

[22] Filed: Sep. 18, 1998

[30] Foreign Application Priority Data

Sep. 18, 1997 [JP] Japan .................................. 9-253491

[51] Int. Cl.[7] .................................................. F16D 65/10
[52] U.S. Cl. ............................ 188/218 XL; 188/264 AA
[58] Field of Search ........................... 188/18 A, 71.6, 188/218 R, 218 XL, 264 A, 264 AA, 264 R

[56] References Cited

U.S. PATENT DOCUMENTS

| | | | |
|---|---|---|---|
| 3,298,476 | 1/1967 | Day | 188/218 |
| 4,083,435 | 4/1978 | Gallus et al. | 188/218 XL |
| 4,379,501 | 4/1983 | Hagiwara et al. | 188/218 XL |
| 4,523,666 | 6/1985 | Murray | 188/218 XL |
| 4,825,981 | 5/1989 | Otto et al. | 188/218 XL |
| 4,867,284 | 9/1989 | Okamura et al. | 188/218 XL |
| 4,928,798 | 5/1990 | Watson et al. | 188/218 XL |
| 5,137,123 | 8/1992 | Setogawa et al. | 188/264 AA |
| 5,492,205 | 2/1996 | Zhang | 188/218 XL |
| 5,542,503 | 8/1996 | Dunn et al. | 188/18 A |

FOREIGN PATENT DOCUMENTS

58-200827 11/1983 Japan .
2125911 3/1984 United Kingdom .

Primary Examiner—Matthew C. Graham
Assistant Examiner—Bradley King
Attorney, Agent, or Firm—Foley & Lardner

[57] ABSTRACT

A ventilated rotor to be disclosed has a first slide board, a second slide board which faces the first slide board and N-numbered (N: natural number, not less than 2) ribs provided between the first and second slide boards. The first and second slide boards have a common central axis, and the N-numbered ribs include ribs, which are in reference providing positions separated from each other at equal angular intervals in the circumferential direction and are elongated in a radial direction perpendicular to the central axis, and N/n-numbered (n: natural number, not less than 2, N/n: natural number) ribs, which are shifted from the reference providing positions by a prescribed angle in one direction of the circumferential direction and are elongated in the radial direction. In another way, the N-numbered ribs includes N/n-numbered ribs which have divided portions divided with separation from each other in the radial direction. Moreover, the N/n-numbered ribs are respectively placed first in every n-numbered ribs of the N-numbered ribs.

16 Claims, 8 Drawing Sheets

VENTILATED ROTOR

The contents of Application No. TOKUGANHEI 9-253491, with a filling date of Sep. 18, 1997 in Japan, are hereby incorporated by reference.

BACKGROUND OF THE INVENTION

1. Field of the Invention

The present invention relates to a ventilated rotor which is suitably used as a rotor for a disc brake of a vehicle, more specifically, relates to a ventilated rotor in which vibration characteristic is improved and so-called brake noise is reduced effectively.

2. Description of the Related Art

A rotor for a disc brake of a vehicle rotates together with a wheel and has a pair of opposed slide boards which respectively form friction surfaces together with corresponding one of a pair of brake pads. When the brake pads are respectively brought into contact with corresponding one of the slide boards and they slide, the wheel is braked and its rotation is stopped.

An example of such a rotor for the disk brake is a ventilated rotor.

This ventilated rotor improves a cooling characteristic of the rotor by utilizing ventilation effect, and its resultant braking property reduces the effect of a friction heat. More specifically, the ventilated rotor is arranged so that a plurality of vent holes are formed between an inner circumference portion and outer circumference portion of the rotor.

Moreover, in the disc brake having such a ventilated rotor, it is one of important research and development items to reduce brake noise from a viewpoint of obtaining high product property.

Japanese Patent Application Laid-Open No. 58-200827 discloses a conventional ventilated rotor which is devised in order to reduce brake noise.

Figure 1:
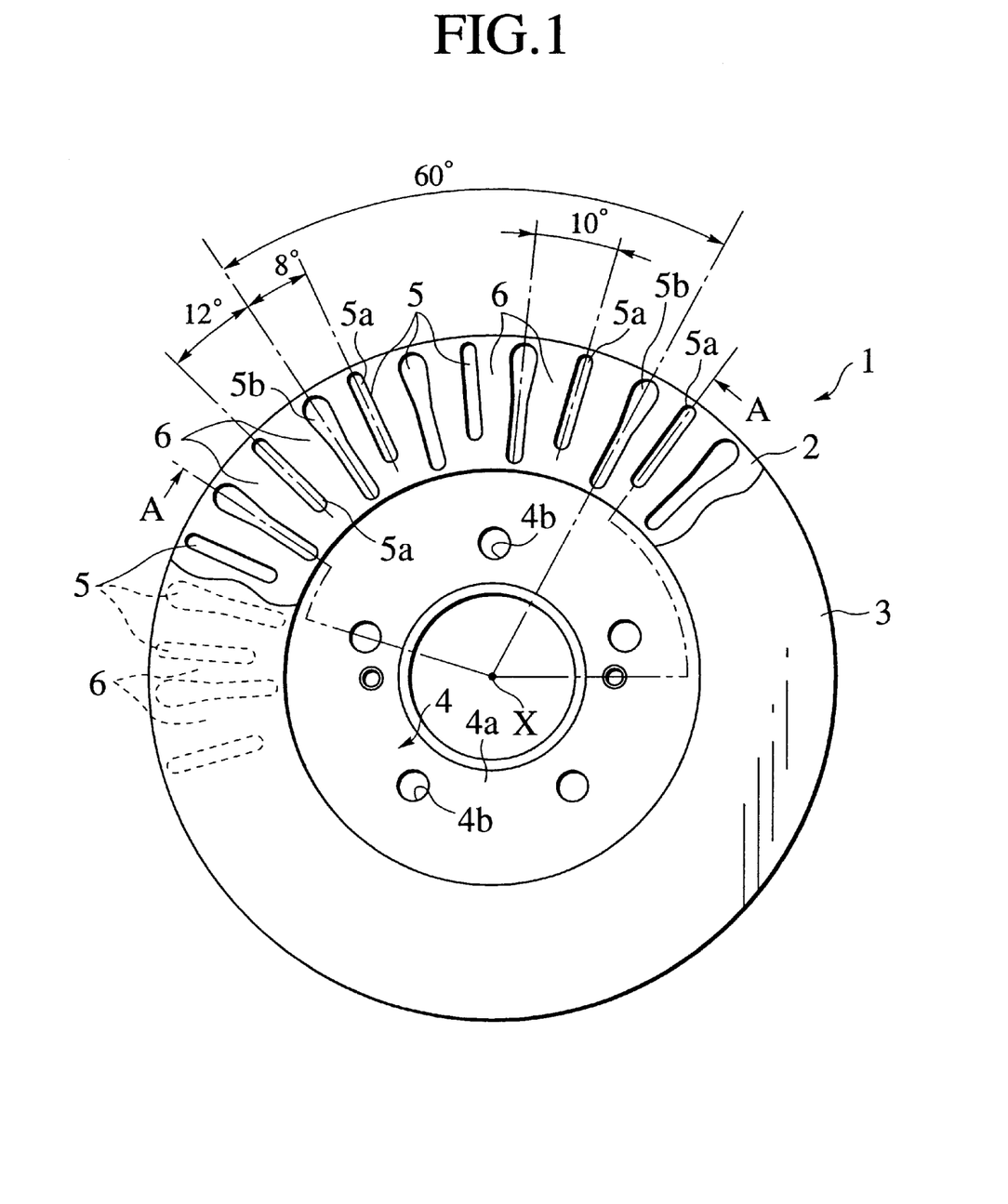
FIG. 1 is a front view, with portions broken away, of a ventilated rotor according to a first embodiment of the present invention.
Figure 2:
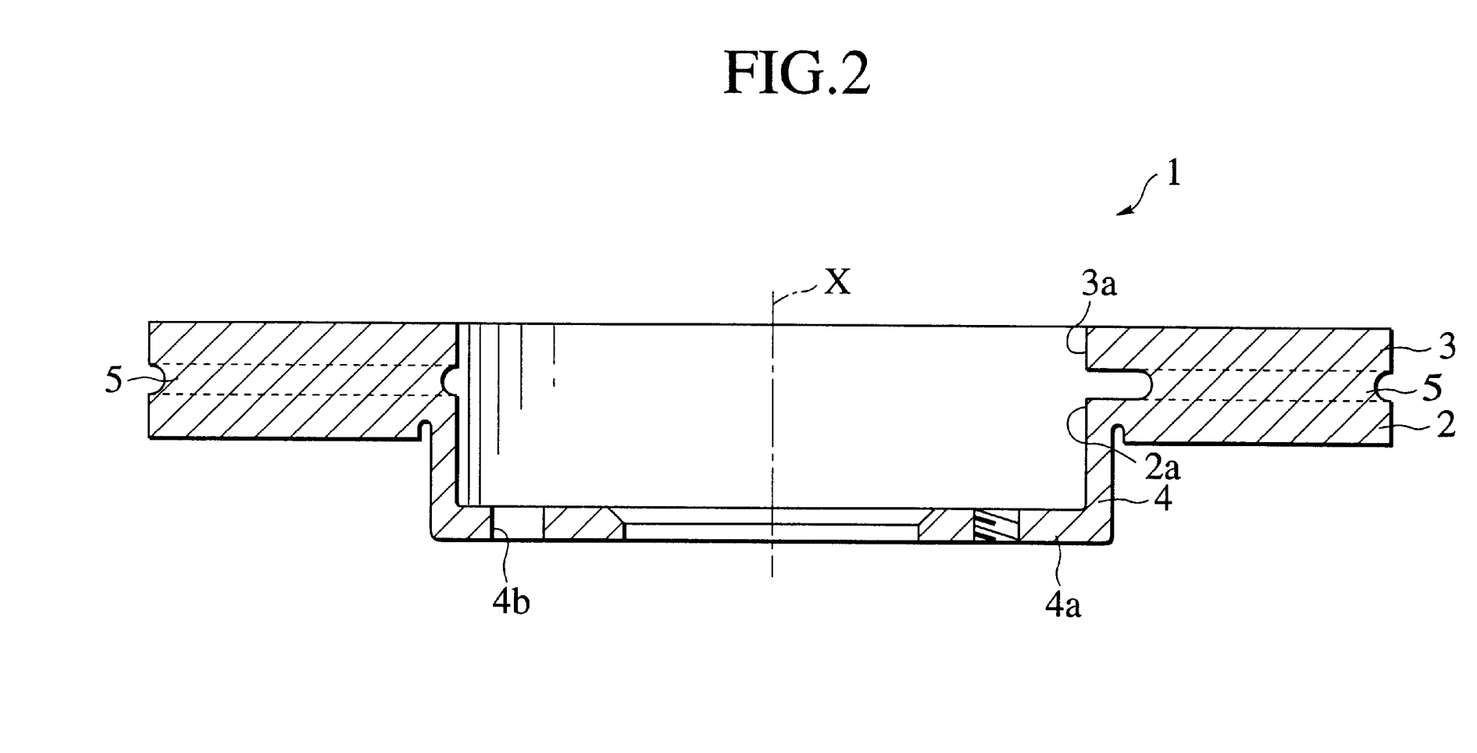
FIG. 2 is a drawing corresponding a sectional view taken along line A—A in FIG. 1.

Particularly in FIGS. 1 and 2 of this publication, between cyclic slide boards which face each other and respectively form friction surfaces with corresponding one of brake pads, thirty cooling fins are provided, and the spaces between the cooling fins serve as vent holes. These cooling fins form six groups, each group composed of five cooling fins, and the intervals between the groups and between the cooling fins respectively have sizes of $\theta2$, $\theta1$, $\theta0$, $\theta1$ and $\theta2$ ($\theta2>\theta1>\theta0$) in order from the end, and widths of the cooling fins in each group are respectively a2, a1, a0, a1, and a2 (a2>a1>a0) in order from the end.

In such an arrangement, the ventilated rotor has a form such that the inner arrangement between the cyclic slide boards are repeated periodically six times in the circumferential direction, and as a result, this prevents a stationary vibration mode of a diameter node of multiples of 3 from occurring.

However, in such a conventional arrangement, the occurrence of a vibration mode of an arbitrary diameter node can be prevented theoretically, and thus the brake noises can be restrained, but in the case where this is applied to a vehicle practically, further improvement is desired.

SUMMARY OF THE INVENTION

It is an object of the present invention to, in the case where the present invention is applied to a brake of a vehicle, typically, a disc brake of a vehicle, provide a ventilated rotor which can separate multiple root of the vibration mode of a diameter node securely and efficiently and can reduce the vibration mode securely and efficiently so as to restrain brake noises securely and efficiently when actuating the disc brake.

Namely, a first typical arrangement of a ventilated rotor according to the present invention has a first slide board; a second slide board which faces the first slide board; and N-numbered ribs (N: natural number, not less than 2) provided between the first and second slide boards, and spaces between the N-numbered ribs form ventilation holes. Here, the first and second slide boards have a common central axis, and the N-numbered ribs include ribs, which are respectively positioned in a corresponding position of reference providing positions at equal angular interval in a circumferential direction around the central axis and are respectively elongated in a radial direction intersecting perpendicularly to the central axis, and N/n-numbered ribs (n: natural number, not less than 2, N/n: natural number), which are shifted from corresponding one of the reference providing positions by a prescribed angle in one direction of the circumferential direction and are respectively elongated in the radial direction. Moreover, the N/n-numbered ribs are respectively placed first in every n-numbered ribs of the N-numbered ribs.

In the experiments and analysis substantially conducted by the inventors of the present invention, according to the result of experiment and analysis in which attention is given to a diameter 6-node mode (diameter node mode of the sixth order) in the ventilated rotor applied to a disk brake of a vehicle having thirty-six ribs between the slide boards, in order to separate a multiple root of the diameter 6-node mode, it was the most effective that ribs of the thirty-six ribs were removed in every six ribs.

However, in the case where the ribs were removed completely in such a manner, deflection of the slide boards of the ventilated rotor occurred due to lowering of stiffness in a portion of the slide boards of the ventilated rotor where the ribs were removed, and as a result, it was confirmed that noises occurred when the brake was actuated.

Therefore, by conducting further experiment and proceeding with the analysis, it was understood that in the arrangement such that in the ribs were not removed completely, the multiple root of the diameter 6-node mode could be separated securely.

One of these arrangements is the aforementioned first typical arrangement according to the present invention, and when description is given based on the arrangement that the thirty-six ribs are provided between the slide boards, every six ribs of the thirty-six ribs are shifted by a prescribed angle, for example, 2° in a constant direction of the circumferential direction.

In more general expression, in the arrangement where the N-numbered ribs are provided between the slide boards, by adopting an arrangement such that N/n-numbered ribs are placed first in every n-numbered ribs of the N-numbered ribs are shifted by a prescribed angle in one direction of the circumferential direction, the multiple root of the diameter node mode of the N/n-th order can be separated efficiently.

Moreover, another arrangement based on the new knowledge according to the experiment and analysis substantially conducted by the inventors has a first slide board, a second slide board which faces the first slide board and N-numbered ribs (N: natural number, not less than 2) provided between the first and second slide boards, and spaces of the N-numbered ribs form ventilation holes. Here, the first and second slide boards have a common central axis, and the N-numbered ribs are provided in a circumferential direction around the central axis and include N/n-numbered ribs (n: natural number, not less than 2, N/n: natural number) which respectively have portions divided with separation from each other in a radial direction intersecting perpendicularly to the central axis and are elongated in the radial direction, and the N/n-numbered ribs are respectively placed first in every n-numbered ribs of the N-numbered ribs.

In this case, by adopting an arrangement such that every n-numbered ribs of the N-numbered ribs are divided in the radial direction concerning the arrangement such that the ribs of the N-numbered ribs between the slide boards are not removed completely, the multiple root of the diameter node mode of the N/n-th order can be separated efficiently.

Needless to say, the arrangement, which is the first typical arrangement according to the present invention such that every n-numbered ribs are shifted by a prescribed angle in one direction of the circumferential direction, can be combined with the arrangement, which is the second typical arrangement according to the present invention such that every n-numbered ribs are divided in the radial direction. According to this arrangement, the multiple root of the diameter node mode of the N/n-th order can be separated more securely and efficiently.

Here, it is preferable that the N/n-numbered ribs shifted in every n-numbered ribs are shifted from the reference providing positions by substantially 1/5 angle of an angle between the adjacent reference providing positions in one direction of the circumferential direction.

In the case of the sifted angle of such a degree, the lowering of stiffness in a portion of the slide boards of the ventilated rotor can be neglected practically, and deflection of the slide boards of the ventilated rotor does not occur, so noises does not occur when the brake is actuated.

More specifically, the shifted angle is 2°.

Further, it is preferable that widths in the circumferential direction of the N/n-numbered ribs placed first in every n-numbered ribs are smaller than widths in the circumferential direction of the ribs provided in the reference providing positions because such an arrangement is very close to the arrangement that every n-numbered ribs are removed.

In addition, it is preferable that the N-numbered ribs between the slide boards include ones each of having a shape such that its width becomes larger outward in the radial direction because such an arrangement is equivalent to the case where mass is added to the ribs. This is because a center of gravity of the ribs moves outward in the radial direction, and thus the addition of mass can contribute to the separation of the multiple root.

More specifically, the N-numbered ribs are even-numbered ribs, and every other rib of the even-numbered ribs may have a shape such that its width becomes larger outwards in the radial direction.

In addition, the N-numbered ribs may include ones whose lengths in the radial direction are long relatively.

In addition, the N/n-numbered ribs provided in every n-numbered ribs may have divided portions divided into three in the radial direction.

Further, the N/n-numbered ribs may be arranged so that the divided portions are shifted outward in the radial direction. In this arrangement, the centers of gravity of the ribs move outwards in the radial direction, so this arrangement can contribute to the separation of the multiple root.

DETAILED DESCRIPTION OF THE PREFERRED EMBODIMENTS

The following describes in detail respective embodiments of the present invention on reference to the drawings.

First, the first embodiment of the present invention is described on reference to FIGS. 1 and 2.

FIG. 1 is a front view, with portions broken away, of a ventilated rotor according to the first embodiment of the present invention, and FIG. 2 is a drawing corresponding to a sectional view taken along line A—A in FIG. 1.

A ventilated rotor 1 shown in FIGS. 1 and 2 has a central axis X, and has a slide board 2 provided to the outside in a widthwise direction of a vehicle along the central axis X, and a slide board 3 which is provided to the inside in the widthwise direction of the vehicle coaxially with the slide board 2 with it facing the slide board 2 in parallel.

Openings 2a and 3a are formed respectively in central portions of the slide boards 2 and 3. The openings 2a and 3a have a circular form and the same size, and they are provided coaxially with the slide boards 2 and 3.

A cylindrical section 4, in which its cylindrical side surface is protruded, is formed on the outer slide board 2 so as to direct from the opening 2a towards the outside in the widthwise direction of the vehicle along the central axis X. The cylindrical section 4 has a bottom surface 4a, and by the bottom surface 4a, the cylindrical side surface is closed on the outside in the widthwise direction of the vehicle. A plurality of holes 4b which penetrate fitting bolts of wheels, or the like, are provided to the bottom surface 4a, and the wheels are fixed to the bottom surface 4a by use of bolts, not shown, respectively through the holes 4b.

A plurality of ribs 5 are formed between the slide boards 2 and 3 radially in a radial direction which is vertical to the central axis X of the slide boards 2 and 3, the spaces between the ribs 5 form ventilation holes 6.

In the above arrangement, when the brake is actuated, brake pads, not shown, are brought into contact with the slide boards 2 and 3 respectively, and friction force between the slide boards 2 and 3 and the corresponding brake pads stops the rotation of the wheels.

Here, in the present embodiment, a number of the ribs 5 is 36 (N=36).

The thirty ribs 5a of the ribs 5 are in reference providing positions at intervals of 10° in a circumferential direction which is vertical to the radial direction of the slide boards 2 and 3, and the other six ribs 5b are in positions, which are shifted by 2° from the reference providing positions, in the clockwise circumferential direction of FIG. 1.

Here, the respective six ribs 5b are provided so as to sandwich the five ribs 5a in the reference providing positions, namely, in the total arrangement, every six ribs 5b of the ribs 5 are provided in intervals of 60° in the circumferential direction.

An angle of 2° which is displaced from the reference providing positions in the clockwise circumferential direction of FIG. 1 corresponds to an angular interval between the reference providing positions, namely, 1/5 of the angular interval in the circumferential direction between the directly adjacent ribs 5a in the reference providing positions.

In other words, as understandable referring to FIG. 1, the directly adjacent ribs 5 in the reference providing positions are provided with separation of 10° in the circumferential direction.

And the rib 5b not in the reference providing positions is provided with separation of 8° from the rib 5a in the reference providing positions adjacent to the rib 5b in the clockwise circumferential direction, and the rib 5b is provided with separation of 12° from the rib 5a in the reference providing positions adjacent in the counterclockwise circumferential direction. Here, an absolute value of a difference between the angular intervals between the rib 5b and the two ribs 5a which are adjacent to the rib 15b, that is, 8° and 12° is 4°.

Further, as understandable referring to FIG. 1, in the present embodiment, in the thirty-six ribs 5, eighteen ribs 5 in every other position including the ribs 5b have a longer length in the radial direction than that of the eighteen ribs 5 in every other position not including the ribs 5b, and have a wider width in the circumferential direction on the outer portion in the radial direction.

More specifically, the positions of the outer ends of the thirty-six ribs 5 in the radial direction are set so as to be uniformly separated from the central axis X in the radial direction.

Meanwhile, the inner ends of the eighteen ribs 5 in every other position including the ribs 5b in the radial direction are positioned on the more inner side than those of the eighteen ribs 5 in every other position not including the ribs 5b, and as a result, these ribs 5 are protruded towards the central axis X relatively.

Moreover, as for the eighteen ribs 5 in every other position including the ribs 5b, their width in the circumferential direction is equal to those of the eighteen ribs 5 in every other position not including the ribs 5b on the inner portion in the radial direction, and their shape is such that the width becomes wider gradually outward in the radial direction. For example, their widths are uniform until the middle point of the radial direction, and the widths are increased linearly when exceeding the middle point outward in the radial direction. Such respective basic shapes are connected smoothly in the vicinity of the middle point, and such a shape is used suitably.

In the above arrangement, in the present embodiment, first, the ribs 5b of the thirty-six ribs 5 are shifted from the reference providing positions by 2° (10/5°) corresponding to an 1/5 angle with respect to the interval of 10° between the reference providing positions so that the every six ribs 5 are provided, so an effect, which is similar to the arrangement in which the ribs 5b are removed, can be obtained.

Accordingly, this arrangement makes it possible to separate the multiple root of the diameter node mode of the sixth (N/n) and ninth order efficiently, and the inventors of the present invention confirmed that brake noises could be reduce efficiently.

Here, the providing positions of the ribs 5b are shifted by 2°, but the ribs 5b are not removed completely, so stiffness such as deflection stiffness of the slide boards 2 and 3 is not lowered essentially. Therefore, the occurrence of noises due to the lowering of the stiffness can be also avoided.

Further, in the present embodiment, since the eighteen ribs 5 in every other position including the ribs 5b has a form such that their widths become wider gradually outward in the radial direction, mass is added to the ribs 5 in every other position, and thus the multiple root separating effect is increased so that the multiple root can be separated more efficiently.

Since the six ribs 5b are positioned at uniform intervals of 60° in the circumferential direction, the rotational balance of the ventilated rotor 1 is not lost.

Figure 3:
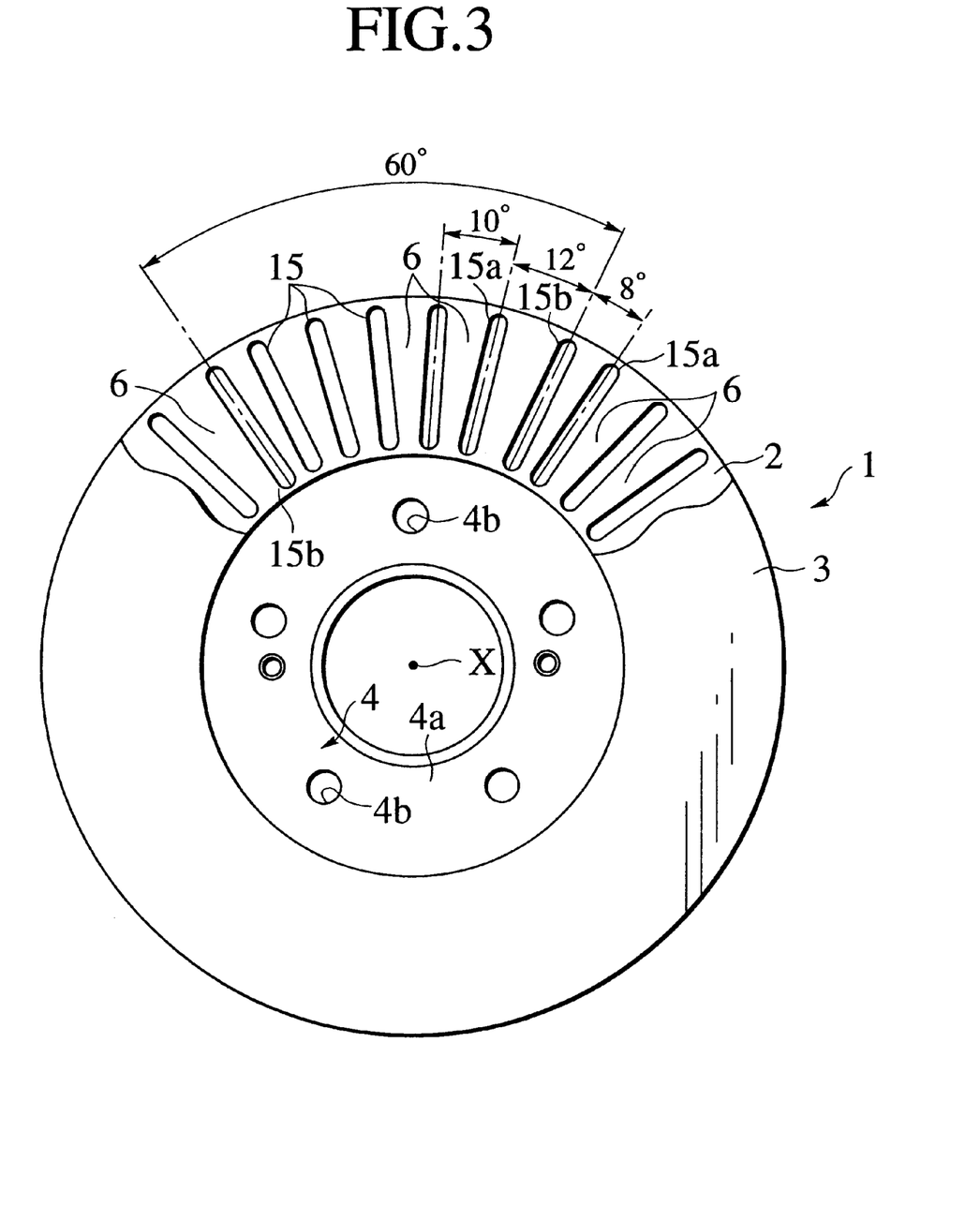
FIG. 3 is a front view, with portions broken away, of a ventilated rotor according to a second embodiment of the present invention.

Next, a second embodiment of the present invention is described on reference to FIG. 3.

FIG. 3 is a front view, with parts broken away, corresponding to FIG. 1 referred in the first embodiment, and the same components as those in the first embodiment are represented by the same reference numerals.

In the present embodiment, the arrangement of providing a plurality of ribs 15 is the same as that in the first embodiment.

Namely, a number of the plural ribs 15 is 36 (N=36).

The thirty ribs 15a are in the reference providing positions which are set at intervals of 10° in the circumferential direction vertical to the radial direction of the slide boards 2 and 3, and the other ribs, i.e., the six ribs 15b are in the positions shifted from the reference providing positions by 2° in the clockwise circumferential direction of FIG. 3.

Here, the six ribs 15b are provided in the circumferential direction so as to sandwich the five ribs 15a in the reference providing positions, namely, in the total arrangement, every six ribs 15 are provided (n=6).

The angle of 2°, which is shifted in the clockwise circumferential direction of FIG. 3 from the reference providing positions, corresponds to the interval between the reference providing positions, namely, 1/5 of the angular interval in the circumferential direction between the directly adjacent ribs 15a in the reference providing positions. Here, the absolute value of a difference between the angular gaps of 12° and 8° between the rib 15b and the two ribs 15a which are adjacent to the rib 15b is 4°.

However, as understandable referring to FIG. 3, in the present embodiment, unlike the first embodiment, the lengths of the thirty-six ribs 15 in the axial direction are set so as to be uniform, and the widths in the circumferential direction are not varied, namely, are constant. However, the widths of the ribs 15b in the circumferential direction are set so as to be smaller than those of the ribs 15a.

In the above arrangement, also in the present embodiment, the ribs 15b of the thirty-six ribs 15 are shifted from the reference providing positions by 2° (10/5°) corresponding to 1/5 angle of the interval of 10° between the reference providing positions, and in the total arrangement, the rib 15b is first placed in every six ribs 15, so the similar effect to the arrangement in which the ribs 15b are removed can be obtained.

Further, since the width of the rib 15b in the circumferential direction is set to be smaller than that of the rib 15a, the effect similar to that in which the ribs 15b are removed is emphasized compared with the first embodiment.

Accordingly, in the present embodiment, the multiple root of the diameter node mode of the sixth (N/n) and ninth order can be separated more efficiently, and as a result, brake noises can be reduced more efficiently.

Needless to say, the providing positions of the ribs 15b are shifted by 2°, but it is the same as the first embodiment that the ribs 15b are not removed completely, so stiffness such as deflection stiffness of the slide boards 2 and 3 is not lowered essentially, and thus the occurrence of noises can be avoided.

Further, since the six ribs 15b are positioned at uniform intervals of 60° in the circumferential direction, the rotational balance of the ventilated rotor 1 is not lost.

Figure 4:
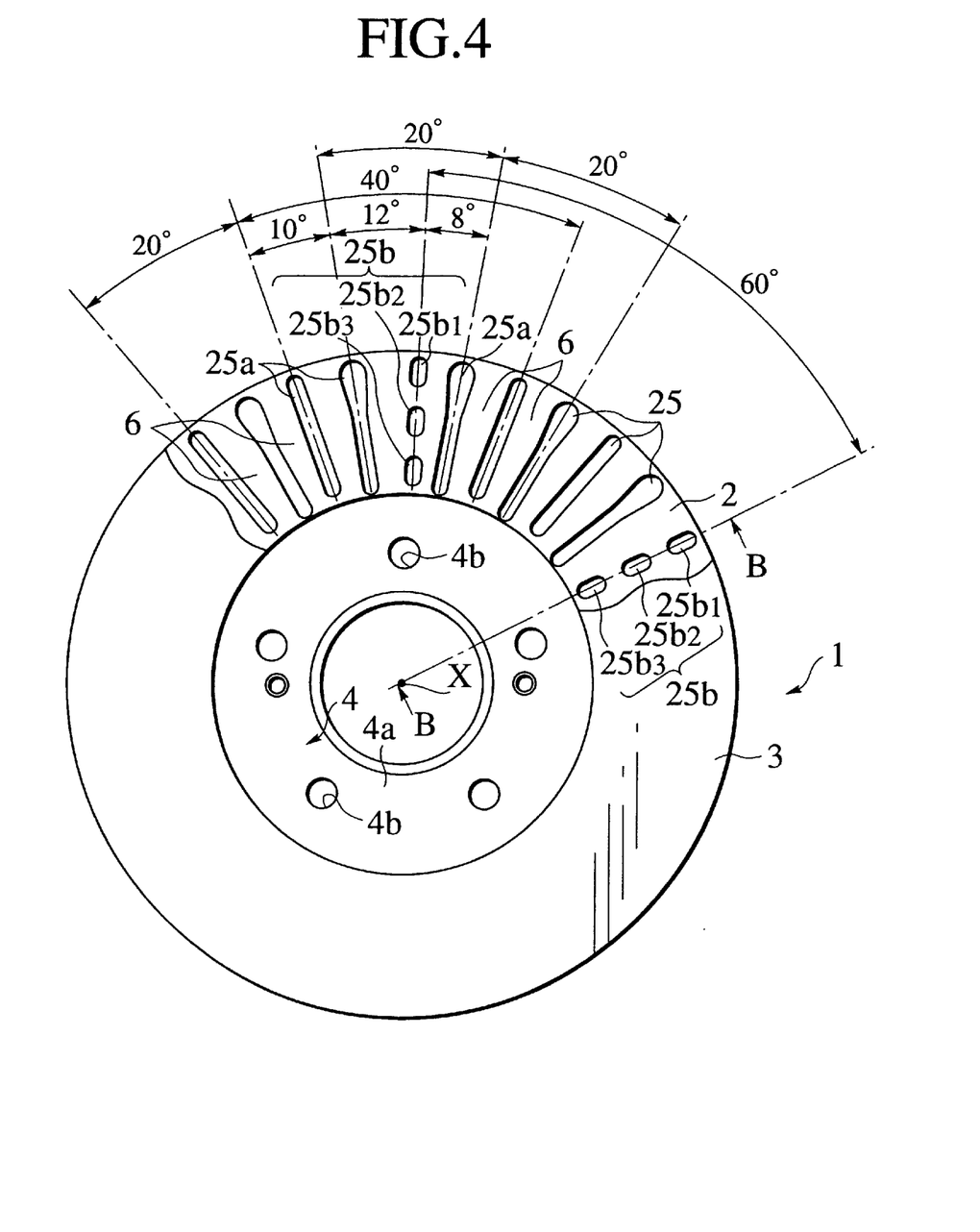
FIG. 4 is a front view, with portions broken away, of a ventilated rotor according to a third embodiment of the present invention.
Figure 5:
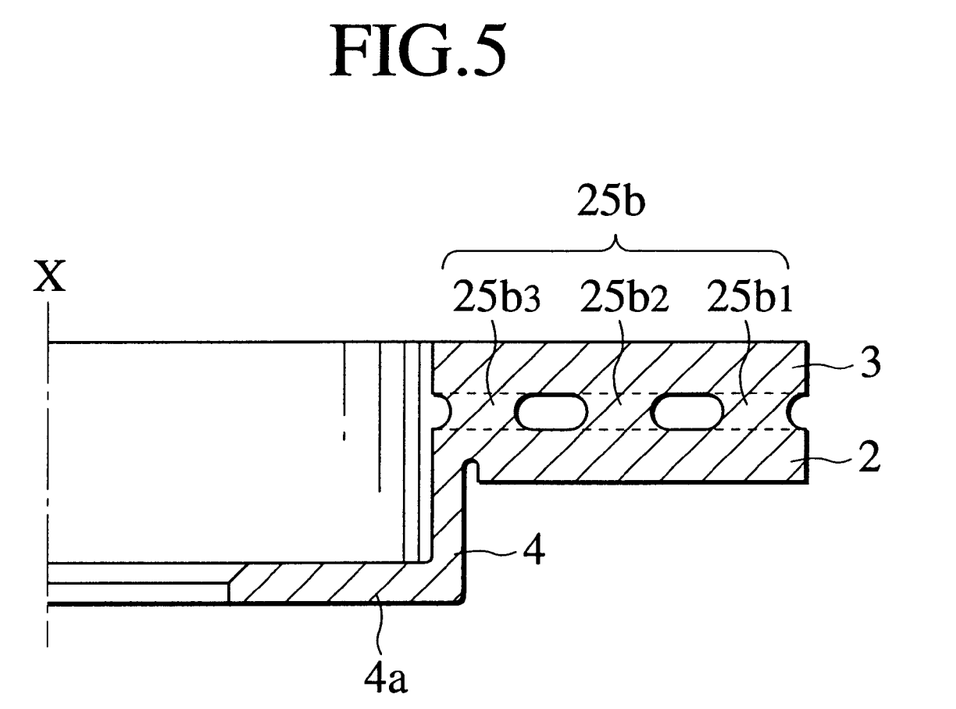
FIG. 5 is a drawing corresponding to a sectional view taken along line B—B in FIG. 4.

The following describes a third embodiment of the present invention on reference to FIGS. 4 and 5.

FIG. 4 is a front view, with parts broken away, of the ventilated rotor according to the present embodiment corresponding to FIG. 1 referred in the first embodiment, and FIG. 5 is a drawing corresponding to a sectional view taken along line B—B in FIG. 4. The components same as those in the first embodiment are represented by the same reference numerals.

Also in the present embodiment, the providing arrangement of a plurality of ribs 25 is the same as that in the first embodiment.

Namely, a number of the plural ribs 25 is 36 (N=36).

The thirty ribs 25a are in the reference providing positions which are set at intervals of 10° in the circumferential direction vertical to the radial direction of the slide boards 2 and 3, and the other ribs, i.e., the six ribs 25b are in the position which is shifted by 2° from the reference providing positions in the clockwise circumferential direction of FIG. 4.

Here, the six ribs 25b are provided in the circumferential direction so as to sandwich the five ribs 25a in the reference providing positions, namely, in the total arrangement, the rib 25b is placed first in every six ribs 25 (n=6).

The angle of 2°, which is shifted in the clockwise circumferential direction of FIG. 4 from the reference providing positions, corresponds to an interval between the reference providing positions, namely, 1/5 of the angular interval in the circumferential direction between the directly adjacent ribs 25a in the reference providing positions. Here, the absolute value of a difference between the angular gaps of 12° and 8° between the rib 25b and the two ribs 25a which are adjacent to the rib 15b is 4°.

However, as understandable referring to FIG. 4, in the present embodiment, as for the widths of the ribs 25 in the circumferential direction, similarly to the second embodiment, the widths of the ribs 25b is set so as to be smaller than those of the ribs 25a.

Further, as understandable referring to FIG. 4, in the thirty-six ribs 25, as for the eighteen ribs 25 in every other position not including the ribs 25b, their lengths in the radial direction are set so as to be longer than those of the eighteen ribs 25 in every other position including the ribs 25b, and their widths on the outer portion in the circumferential direction are set so as to be larger in the radial direction.

More specifically, as for the thirty-six ribs 25, the positions of their outer ends in the radial direction are set at the uniform distance from the central axis X in the radial direction. In the thirty-six ribs 25, as for the eighteen ribs 25 in every other position not including the ribs 25b, their inner ends in the radial direction are positioned on the more inner side in the radial direction than the inner ends of the eighteen ribs 25 in every other position including the ribs 25b, and as a result, the eighteen ribs 25 in every other position not including the ribs 25b are protruded relatively towards the central axis X.

Moreover, as for the eighteen ribs 25 in every other position not including the ribs 25b, their widths on the inner portion of the radial direction in the circumferential direction are equal to those of the eighteen ribs 25 in every other position including the ribs 25b, and the widths become wider gradually outward in the radial direction. For example, their widths are uniform until the middle point of the radial direction, and the widths are increased linearly when exceeding the middle point outward in the radial direction. Such respective basic shapes are connected smoothly in the vicinity of the middle point, and such obtained shape or the like is used suitably.

Furthermore, as understandable referring to FIG. 4, in the present embodiment, the six ribs 25b are divided into three, i.e., $25b_1$, $25b_2$ and $25b_3$ in the radial direction. The lengths in the radial direction of these three portions $25b_1$, $25b_2$ and $25b_3$ are equal, namely, since their widths in the circumferential direction are equal, their sizes are equal. Moreover, the intervals in the radial direction between $25b_1$ and $25b_2$ and between $25b_2$ and $25b_3$ are set so as to be equal to each other.

In the above arrangement, also in the present embodiment, the ribs 25b of the thirty-six ribs 25 are shifted from the reference providing positions by 2° (10/5°) corresponding to 1/5 angle of the interval of 10° between the reference providing positions, and in the total arrangement, the rib 25b is first placed in every six ribs 25. For this reason, the similar effect to the arrangement in which the ribs 25b are removed can be obtained.

Further, since the rib 25b is divided into three, the effect similar to that in which the ribs 25b are removed is emphasized compared with the first embodiment.

This is because to divide the rib 25b in such a manner is to obtain the equivalent effect to that obtained by removing the ribs 25b similarly to the case where the providing positions of the ribs 25b are shifted from the reference providing positions, and thus the effect obtained by dividing the rib 25b is superposed on the effect obtained by shifting the providing positions of the ribs 25 from the reference providing positions. Further, this effect is emphasized similarly to the second embodiment.

Furthermore, since the widths of the ribs 25b in the circumferential direction are set so as to be smaller than those of the ribs 25a, the effect similar to that obtained by removing the ribs 25b is emphasized compared with the first embodiment.

Therefore, in the present embodiment, the multiple root of the diameter node mode of the sixth (N/n) and ninth order can be separated more efficiently, and as a result, brake noises can be reduced more efficiently compared with the first and second embodiments.

Needless to say, the providing positions of the ribs 25b are shifted by 2°, but the ribs 25b are not removed completely. This point is the same as that in the first embodiment, and stiffness such as deflection stiffness of the slide boards 2 and 3 are not lowered essentially, and the occurrence of noises can be avoided.

Further, the effect obtained by adding mass to the ribs 25 in every other position is also same as that in the first embodiment, and thus the multiple root can be separated efficiently.

Since the six ribs 25b are positioned at uniform intervals of 60° in the circumferential direction, the rotational balance of the ventilated rotor 1 is not lost.

Figure 6:
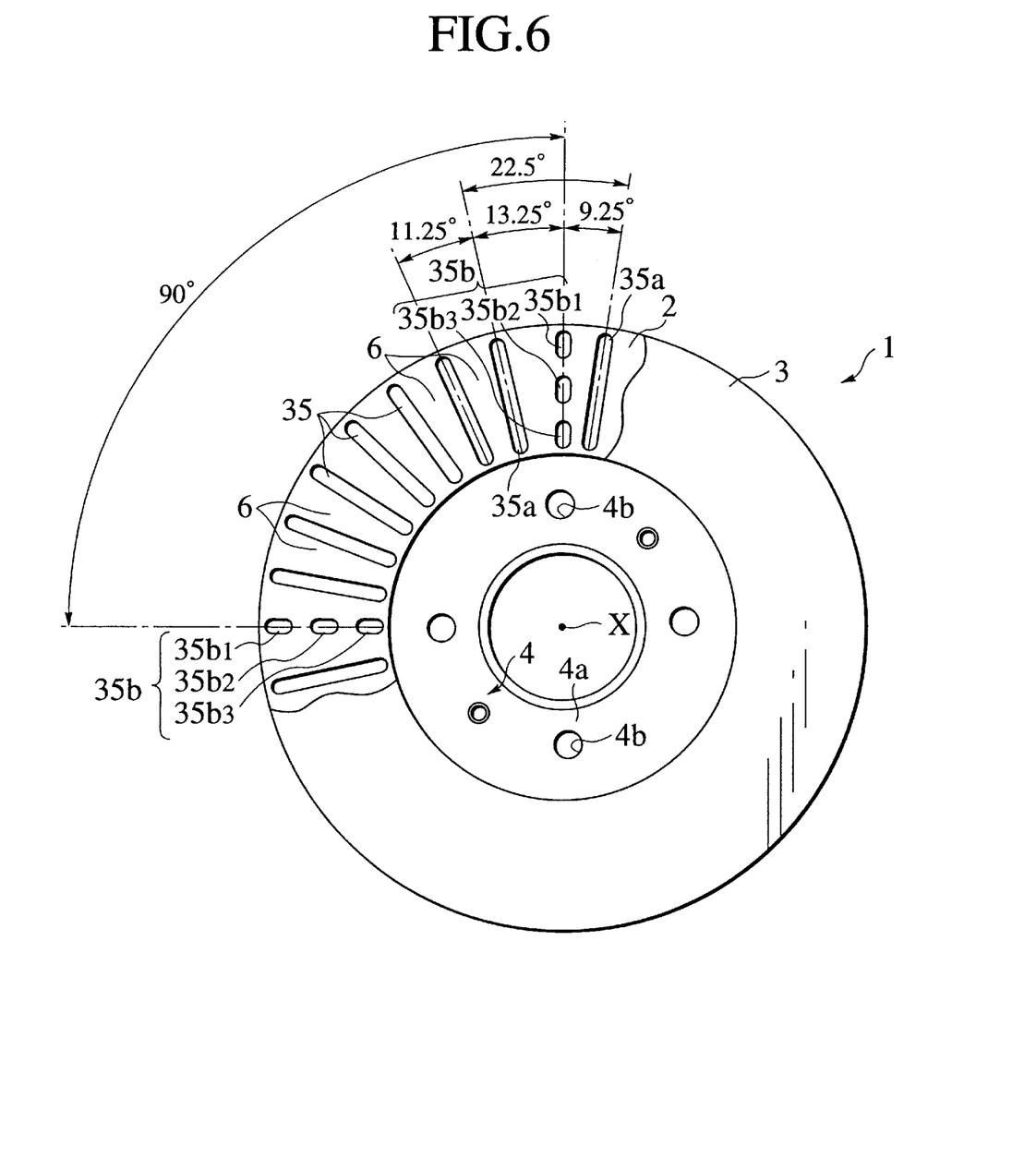
FIG. 6 is a front view, with portions broken away, of a ventilated rotor according to a fourth embodiment of the present invention.

The following describes fourth a of the present invention on reference to FIG. 6.

FIG. 6 is a front view, with parts broken away, corresponding to FIG. 1 referred in the first embodiment, and the components same as those in the first embodiment are represented by the same reference numerals.

In the present embodiment, a number of plural ribs 35 is 32 (N=32).

The twenty-eight ribs 35a are in the reference providing positions which are set at intervals of 11.25° in the circumferential direction vertical to the radial direction of the slide boards 2 and 3, and the other ribs, i.e., the four ribs 35b are in positions which are shifted by 2° from the reference providing positions in the clockwise circumferential direction of FIG. 6.

Here, the four ribs 35b are provided in the circumferential direction so as to sandwich the seven ribs 35a in the reference providing positions, namely, in the total arrangement, the rib 35 is first placed in each eight ribs 35 in the circumferential direction.

In other words, as understandable referring to FIG. 6, the directly adjacent ribs 35a in the reference providing positions are provided at the intervals of 11.25° in the circumferential direction. The ribs 35b not in the reference providing positions are provided with separation of 9.25° from the ribs 35a in the reference providing positions which are adjacent to the ribs 35b in the clockwise circumferential direction, and the ribs 35b are provided with separation of 13.25° from the ribs 35a in the reference providing positions which are adjacent to the ribs 35b in the counterclockwise circumferential direction.

In the present embodiment, the four ribs 35b are in the positions shifted by 2° from the reference providing positions in the clockwise circumferential direction of FIG. 6, but 2° does not correspond to the interval between the reference providing positions described in the first through third embodiments, namely, 2° does not strictly correspond to 1/5 of the angular interval in the circumferential direction between the directly adjacent ribs 35a in the reference providing positions, but it can be evaluated as a value corresponding to 1/5 of the angular interval substantially.

The absolute value of a difference between the angular intervals of 13.25° and 9.25° between the rib 35b and the two ribs 35a which is adjacent to the rib 35b is 4°, and as for this point, the condition, which is similar to the case where the absolute value of a difference between 12° and 8° in the first through third embodiments is 4°, is maintained.

As understandable referring to FIG. 6, in the present embodiment, as for all the thirty-two ribs 35, their inner end portions and outer end portions in the radial direction are positioned with uniform separation from the central axis X so that their lengths in the radial direction become equal, and the widths of the ribs 35 in the circumferential direction are set to be equal.

Further, the four ribs 35b are respectively divided into three portions, i.e., $35b_1$, $35b_2$ and $35b_3$. The lengths of the three portions $35b_1$, $35b_2$ and $35b_3$ in the radial direction are equal, namely, their sizes are equal, and the intervals between $35b_1$ and $35b_2$ and between $35b_2$ and $35b_3$ are set to be equal.

In the above arrangement, also in the present embodiment, the ribs 35b of the thirty-two ribs 35 are shifted from the reference providing positions by 2° (≈11.25/5°) substantially corresponding to 1/5 angle of 11.25° which is the interval of the reference providing positions, and in the total arrangement, the rib 35b is placed first in every eight ribs 35, so an effect similar to one obtained by removing the ribs 35b can be obtained.

Therefore, in the present embodiment, the multiple root of the diameter node mode of the fourth (N/n), second and sixth order can be separated efficiently, and as a result, the brake noises due to the mode of the above order can be reduced efficiently.

Further, in the present embodiment, since the rib 35b is divided into three, the effect obtained by removing the rib 35b is further emphasized.

Needless to say, the providing positions of the ribs 35b are shifted by 2°, but the ribs 35b are not removed completely. This point is the same as that in the first embodiment, so stiffness such as deflection stiffness of the slide boards 2 and 3 are not lowered substantially, and the occurrence of noises are can be also avoided.

Here, since the four ribs 35b are provided at uniform intervals of 90° in the circumferential direction, the rotational balance of the ventilated rotor 1 is not lost.

Figure 7:
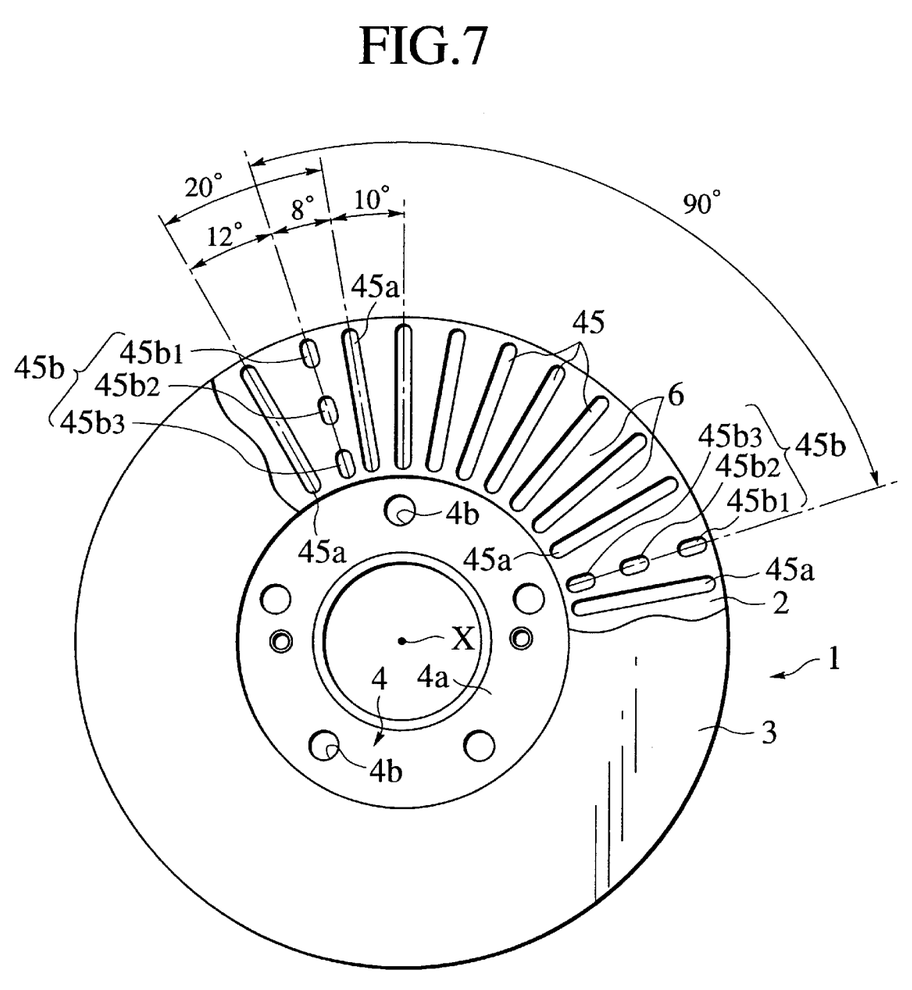
FIG. 7 is a front view, with portions broken away, of a ventilated rotor according to a fifth embodiment of the present invention.

The following describes the fifth embodiment on reference to FIG. 7.

FIG. 7 is a front view, with portions broken away, corresponding to FIG. 1 referred in the first embodiment, and the components same as those in the first embodiment are represented by the same reference numerals.

In the present embodiment, similarly to the first embodiment, a number of plural ribs 45 are 36 (N=36).

Here, the thirty-two ribs 45a are in the reference providing positions which are set at intervals of 10° in the circumferential direction vertical to the radial direction of the slide boards 2 and 3, and the other ribs, namely, the four ribs 45b are in positions which are shifted by 2° from the reference providing positions in the clockwise circumferential direction of FIG. 7.

The four ribs 45b are respectively provided in the circumferential direction so as to sandwich the eight ribs 45a provided in the reference providing positions, namely, in the total arrangement, the rib 45b is placed first in every nine ribs 45 (n=9). The angle of 2° for a shift from the reference providing positions in the clockwise circumferential direction of FIG. 7 corresponds to the interval between the reference providing positions, namely, 1/5 of the angular interval in the circumferential direction between the directly adjacent ribs 45a in the reference providing positions.

In other words, as understandable referring to FIG. 7, the directly adjacent ribs 45a in the reference providing positions are provided with separation of 10° in the circumferential direction.

The ribs 45b not in the reference providing positions are provided with separation of 8° from the ribs 45a in the reference providing positions which are adjacent to the ribs 45b in the clockwise circumferential direction, and with separation of 12° from the ribs 45a in the reference providing positions which are adjacent to the ribs 45b in the counterclockwise circumferential direction. The absolute value of a difference between the angular intervals of 12° and 8° between the rib 45b and the two ribs 45a which are adjacent to the rib 45b is 4°.

As understandable referring to FIG. 7, in the present embodiment, as for the thirty-six ribs 45, their widths in the circumferential direction are not varied, namely, are constant, and their inner end positions and outer end positions in the radial direction are set respectively with uniform separation from the axial direction X so that all their lengths in the radial direction become constant.

Further, as for the four ribs 45b, their widths in the circumferential direction are set to be smaller than those of the ribs 45a, and the ribs 45b are divided respectively into three portions $45b_1$, $45b_2$ and $45b_3$ in the radial direction. The lengths of the three portions $45b_1$, $45b_2$ and $45b_3$ in the radial direction are equal, namely, their sizes are equal, and the intervals between $45b_1$ and $45b_2$ and between $45b_2$ and $45b_3$ are set to be equal.

According to the above arrangement, also in the present embodiment, the ribs 45b of the thrifty-two ribs 45 are shifted from the reference providing positions by 2° (10/5°) corresponding to 1/5 of the interval of 10° between the reference providing positions, and in the total arrangement, the rib 45b is placed in every nine ribs 45, so the effect provided by the arrangement in which the ribs 45b are removed can be obtained.

Further, the widths of the ribs 45b in the circumferential direction are set so as to be smaller than those of the ribs 45a, and the ribs 45b are respectively divided into three, so the effect which is similar to that obtained by removing the ribs 45b is further emphasized.

Accordingly, in the present embodiment, the multiple root of the diameter node mode of the fourth (N/n), second and sixth order can be separated more efficiently compared with the fourth embodiment, and as a result, brake noises due to the mode of the above order can be reduced efficiently.

Needless to say, similarly to the first embodiment, the providing positions of the ribs 45b are shifted by 2° and they are not removed completely, and stiffness such as deflection stiffness of the slide boards 2 and 3 is not lowered substantially, so the occurrence of noises can be avoided.

Here, since the four ribs 45b are provided with uniform intervals of 90° in the circumferential direction, the rotational balance of the ventilated rotor 1 is not lost.

Figure 8:
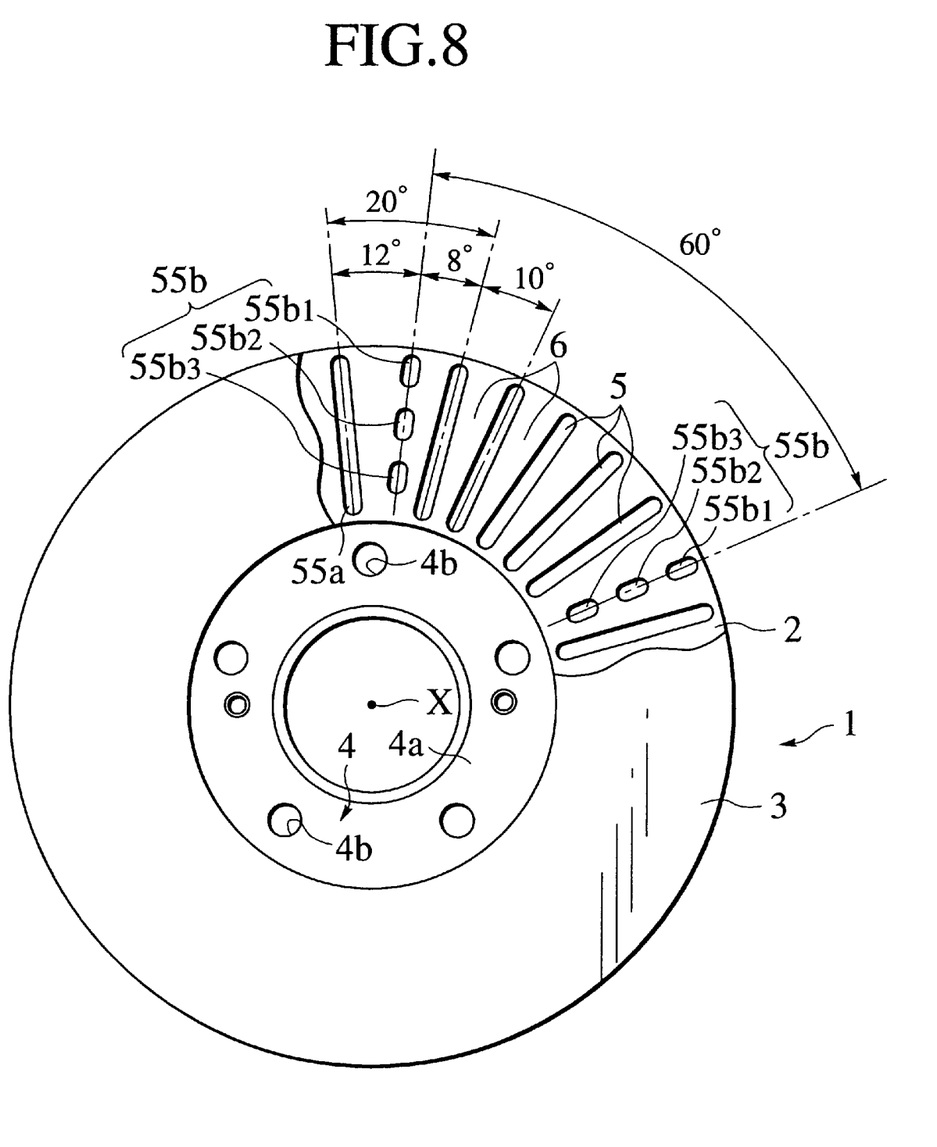
FIG. 8 is a front view, with portions broken away, of a ventilated rotor according to a sixth embodiment of the present invention.

The following describes a sixth embodiment of the present invention on reference to FIG. 8.

FIG. 8 is a front view, with parts broken away, corresponding to FIG. 1 referred in the first embodiment, and the components which are the same as those in the first embodiment are represented by the same reference numerals.

In the present embodiment, a number of plural ribs 55 is 36 (N=36).

The thirty ribs 55a are in the reference providing positions which are set at intervals of 10° in the circumferential direction vertical to the radial direction of the slide boards 2 and 3, and the other ribs, namely, the six ribs 55b are in positions which are shifted by 2° from the reference providing positions in the clockwise circumferential direction of FIG. 8.

Here, the six ribs 55b are respectively provided in the circumferential direction so as to sandwich the five ribs 55a provided in the reference providing positions, namely, in the total arrangement, the rib 55b is placed first in every six ribs 55 (n=6).

The angle of 2° for a shift from the reference providing positions in the clockwise circumferential direction of FIG. 8 corresponds to 1/5 of the interval between the reference providing positions, namely, 1/5 of the angular interval in the circumferential direction between the directly adjacent ribs 55a provided in the reference providing positions.

In other words, as understandable referring to FIG. 8, the directly adjacent ribs 55a provided in the reference providing positions are provided at intervals of 10° in the circumferential direction.

And the ribs 55b not in the reference providing positions are provided with separation of 8° from the ribs 55a in the reference providing positions which are adjacent to the ribs 55b in the clockwise circumferential direction, and with separation of 12° from the ribs 55a in the reference providing positions which are adjacent to the ribs 55b in the counterclockwise circumferential direction.

Here, the absolute value of a difference between 12° and 8° which are the angular intervals between the rib 55b and the two ribs 55a which are adjacent to the rib 55b is 4°.

Further, the widths of the thirty-six ribs 55 in the circumferential direction are not varied, namely, are constant, but the widths of the six ribs 55b in the circumferential direction are set so as to be smaller than those of the ribs 55a, and the ribs 55b are respectively divided into three portions $55b_1$, $55b_2$ and $55b_3$ in the radial direction. The lengths in the radial direction and the widths in the circumferential direction of the three portions $55b_1$, $55b_2$ and $55b_2$ are uniform, namely, their sizes are equal, and the intervals between $55b_1$ and $55b_2$ and between $55b_2$ and $55b_3$ are equal.

However, in the present embodiment, in the three portions $55b_1$, $55b_2$ and $55b_3$, the inner end of $55b_3$ in the innermost position in the radial direction is provided on more outer side in the axial direction than the inner end of the rib 55a, and as a result, the arrangement is displaced outward in the radial direction. This dividing arrangement is equivalent to an arrangement such that the ribs 55b are divided into 4 with equal separation from each other into uniform sizes and the part in the innermost position is eliminated.

As for all the thirty-six ribs 55, the positions of their outer ends in the radial direction are set with constant separation from the central axis X in the radial direction, and this point is the same as that in the first embodiment.

According to the above arrangement, in the present embodiment, the ribs 55b of the thirty-six ribs 55 are shifted from the reference providing positions by 2° (10/5°) corresponding to 1/5 angle of the interval of 10° between the reference providing positions, in the total arrangement, the rib 55b is placed first in very six ribs 55, so the effect, which is similar to that in the arrangement where the ribs 55b are removed, can be obtained.

Therefore, according to this arrangement, it can be understood that the multiple root of the diameter node mode of the sixth (N/n) and ninth order can be separated efficiently.

Further, since the rib 55b is divided into three, the effect, which is similar to that obtained by removing the ribs 55b, is further emphasized.

Furthermore, since the widths of the ribs 55b in the circumferential direction are set so as to be smaller than those of the ribs 55a, the effect, which is similar to that obtained by removing the ribs 55b, is further emphasized.

Here, since the ribs 55b are not completely removed and their providing positions are shifted by 2°, the stiffness such as deflection stiffness of the slide boards 2 and 3 is not lowered substantially. Therefore, the occurrence of noises due to the lowering of the stiffness can be avoided.

Since the six ribs 55b are provided with uniform intervals of 60° in the circumferential direction, the rotational balance of the ventilated rotor 1 is not lost.

The aforementioned embodiments representatively described the example using the arrangement of the present invention where the multiple root of the diameter node mode of the sixth and ninth or fourth, second and sixth order is separated efficiently, but the present invention is not limited to this, so the arrangement of the present invention can be sufficiently applied to an example that the multiple root of the diameter node mode of another order is separated.

In addition, the embodiments representatively described the cases where the number of the ribs is 36 and 32, but the present invention is not limited to these cases, so the number of the ribs can be suitably set according to the required effect of ventilation and an allowable size, etc. of a ventilated rotor.

In addition, the embodiments representatively described the cases where the ribs, respectively placed first in every six or four ribs in the total arrangement, are respectively shifted by a prescribed angle in the circumferential direction from the reference providing positions, are respectively divided in such positions and/or have widths in the circumferential direction so as to be relatively smaller in such positions. However, needless to say, the present invention is not limited to such a number of the ribs in such positions, so the number of the ribs can be suitably set according to a total number of the ribs and the order of the diameter node mode which should be separated, etc.

In addition, the angle for shifting the ribs was set to 2° in the embodiments, but the present invention is not limited to this, another shift angle can be suitably set as long as the multiple root of the diameter node mode can be separated and the lowering of stiffness or the like does not occur.

Further, a number of dividing the ribs is not limited to three, so another dividing number can be suitably set as long as the multiple root of the diameter node mode can be separated.

Moreover, the shape of the ribs such that their widths become larger outward in the radial direction is not also limited to the shapes described in the embodiments, so another shape can be suitably applied as long as the effect of adding mass can be obtained.

As described above, the ventilated rotor of the present invention can separate the multiple root of the diameter node vibration mode securely and efficiently, and can restrain the vibration mode securely and efficiently. In the case where the ventilated rotor is applied to a disc brake for a vehicle, it can restrain brake noises at the time of actuating a brake securely and efficiently. Therefore, the ventilated rotor can be suitably applied to a disc brake of a vehicle particularly.

What is claimed is:

1. A ventilated rotor, comprising:
    a first slide board;
    a second slide board which faces said first slide board; and
    a total of N-numbered ribs, where N is a natural number not less than 2, provided between said first slide board and said second slide board, wherein the N-numbered ribs are radially elongated, spaces between said N-numbered ribs forming ventilation holes,
    wherein said first slide board and said second slide board have a common central axis, and N reference providing positions spaced at an equal angular interval in a circumferential direction around said common central axis, wherein among said N-numbered ribs is a first set of N/n-numbered ribs, n is a natural number not less than 2, and N/n is a natural number, provided at an interval of n-numbered ribs in said circumferential direction and respectively shifted from a corresponding one of said reference providing positions by a prescribed angle in one direction of said circumferential direction, and a second set of ribs, which are all of the ribs other than ribs in the first set, provided in said reference providing positions.

2. A ventilated rotor, comprising:
    a first slide board;
    a second slide board which faces said first slide board; and
    a total of N-numbered ribs, where N is a natural number not less than 2, provided between said first slide board and said second slide board, spaces of said N-numbered ribs forming ventilation holes,
    wherein said first slide board and said second slide board have a common central axis, and said N-numbered ribs are respectively provided in a circumferential direction around said common central axis and include a first set of N/n-numbered ribs where n is a natural number not less than 2, and N/n is a natural number, which respectively have portions divided with separation from each other in a radial direction intersecting perpendicularly to said common central axis and are respectively elongated in said radial direction, and said N/n-numbered ribs are respectively placed first in every n-numbered rib position of said N-numbered ribs, and where only said first set of ribs have divided portions.

3. A ventilated rotor according to claim 1, wherein each of said first set of ribs has divided portions divided with separation from each other in said radial direction.

4. A ventilated rotor according to claim 1, wherein each of said first set of ribs are respectively shifted from said reference providing positions by substantially 1/5 angle of an angle between the adjacent reference providing positions in one direction of said circumferential direction.

5. A ventilated rotor according to claim 1, wherein each of said first set of ribs are respectively shifted from said reference providing positions by 2° in one direction of said circumferential direction.

6. A ventilated rotor according to claim 1, wherein widths in said circumferential direction of each of said first set of ribs are respectively smaller than widths in said circumferential direction of said second set of ribs.

7. A ventilated rotor according to claim 1, wherein said N-numbered ribs include ones each of which has a shape such that its width in said circumferential direction becomes larger outward in said radial direction.

8. A ventilated rotor according to claim 1, wherein said N-numbered ribs are an even number of ribs, and each of every other rib of said even-numbered ribs has a shape such that its width in said circumferential direction becomes larger outward in said radial direction.

9. A ventilated rotor according to claim 1, wherein said N-numbered ribs include ones whose lengths in said radial direction are longer relatively.

10. A ventilated rotor according to claim 2, wherein widths in said circumferential direction of said N/n-numbered ribs are respectively smaller than widths in said circumferential direction of ribs other than said N/n-numbered ribs.

11. A ventilated rotor according to claim 2, wherein said N-numbered ribs include ones each of which has a shape such that its width becomes larger outward in said radial direction.

12. A ventilated rotor according to claim 2, wherein said N-numbered ribs are an even number of ribs, and each of every other rib of said even number of ribs has a shape such that its width becomes larger outward in said radial direction.

13. A ventilated rotor according to claim 2, wherein said N-numbered ribs include ones whose lengths in the radial direction are longer relatively.

14. A ventilated rotor according to claim 2, wherein the divided portions of said N/n-numbered ribs are divided into three in said radial direction.

15. A ventilated rotor according to claim 14, wherein said divided portions divided into three of said N/n-numbered ribs are shifted outwards in said radial direction.

16. A ventilated rotor according to claim 1, wherein said prescribed angle is constant.

* * * * *